United States Patent [19]

Macqueene

[11] Patent Number: 5,161,405

[45] Date of Patent: Nov. 10, 1992

[54] CLUTCH PEDAL POSITON SENSOR CONTINUOUS CALIBRATION

[75] Inventor: James W. Macqueene, Willowbrook, Ill.

[73] Assignee: Ford New Holland, Inc., New Holland, Pa.

[21] Appl. No.: 709,186

[22] Filed: Jun. 3, 1991

[51] Int. Cl.$^5$ ..................... G01D 18/00; G06F 15/20
[52] U.S. Cl. .................... 73/1 R; 364/571.05
[58] Field of Search ................. 73/1 R, 1 D; 324/202; 364/571.05, 571.02

[56] References Cited

U.S. PATENT DOCUMENTS

| | | | |
|---|---|---|---|
| 3,763,362 | 10/1973 | Griem, Jr. | 364/572 |
| 4,875,674 | 10/1989 | Dreissigacker et al. | 73/1 R |
| 4,951,206 | 8/1990 | Kyohzuka | 364/571.05 |
| 4,989,147 | 1/1991 | Ishii | 364/571.05 |
| 5,032,998 | 7/1991 | Filleau | 364/571.05 |
| 5,086,641 | 2/1992 | Roselli | 73/1 D |

OTHER PUBLICATIONS

Development of the Electronic Draft Control System for the Ford New Holland 8210 Tractor; Jim Macqueene; Paul Schwarz; Brad Nielsen; Sep. 10-13, 1990, SAE Technical Paper 901561.

*Primary Examiner*—Hezron E. Williams
*Assistant Examiner*—Howard Wisnia
*Attorney, Agent, or Firm*—Griffin, Butler, Whisenhunt & Kurtossy

[57] ABSTRACT

A non-volatile memory stores values defining a released position or a depressed position of a clutch pedal. A potentiometer mechanically linked to the clutch pedal produces an output signal whose value or magnitude represents the current position of the clutch pedal. When power is turned on, first and second end limit values which electrically define the depressed and released positions of the clutch pedal are read from the memory, a constant value is added to the first end limit value and subtracted from the second. Thereafter, each time the output signal is sensed for control purposes, the output signal is compared with the end limit values. If the output signal is less than the first end limit value it replaces that value in the memory and if the output signal is greater than the second end limit value it replaces that value. The sensor is thus calibrated in a manner transparent to the operator each time the system samples the sensor output signal for control purposes. When either end limit value is changed, threshold values representing specified positions of the clutch pedal relative to its released or depressed position are recalculated and stored for subsequent use as control values.

11 Claims, 1 Drawing Sheet

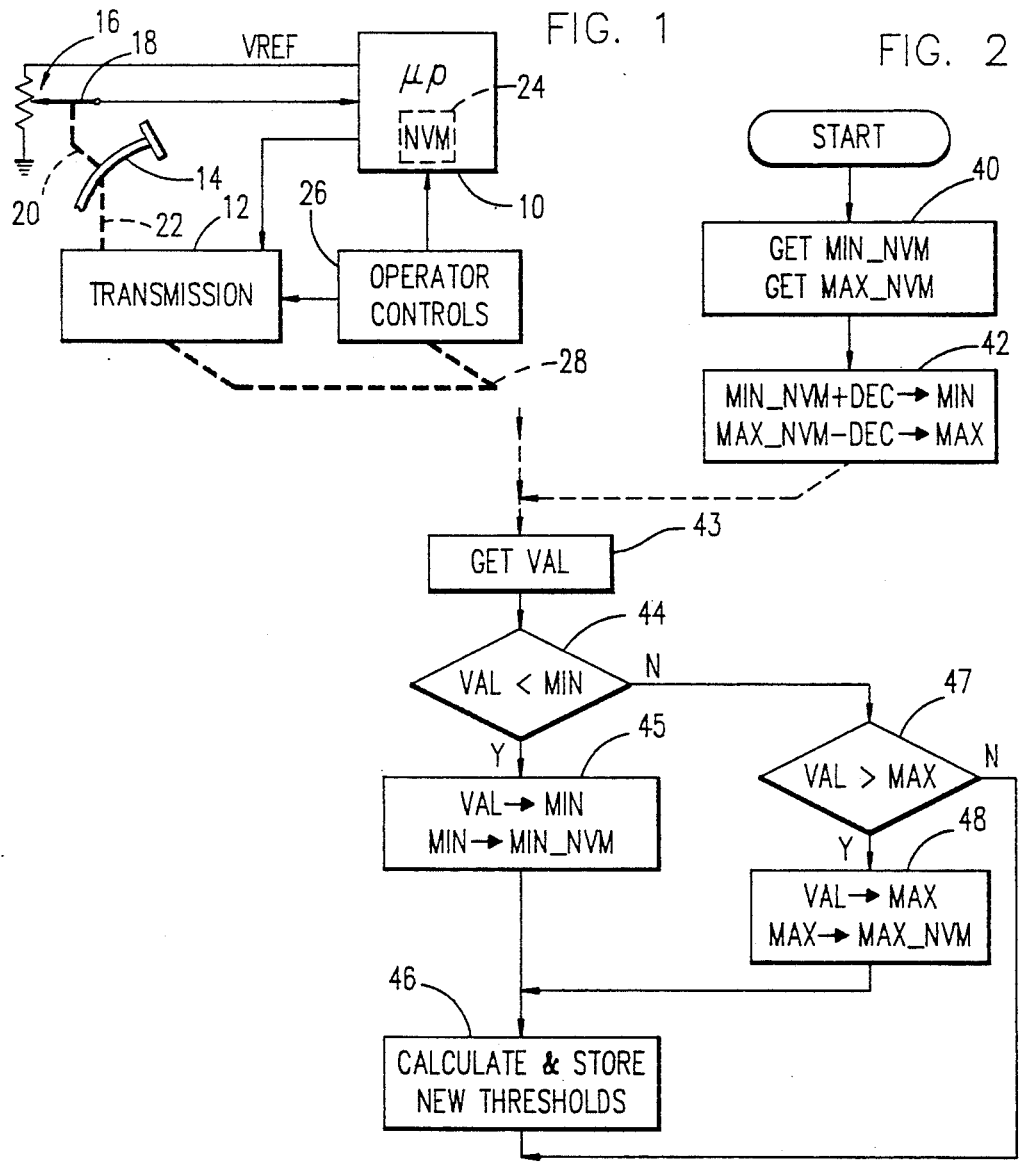
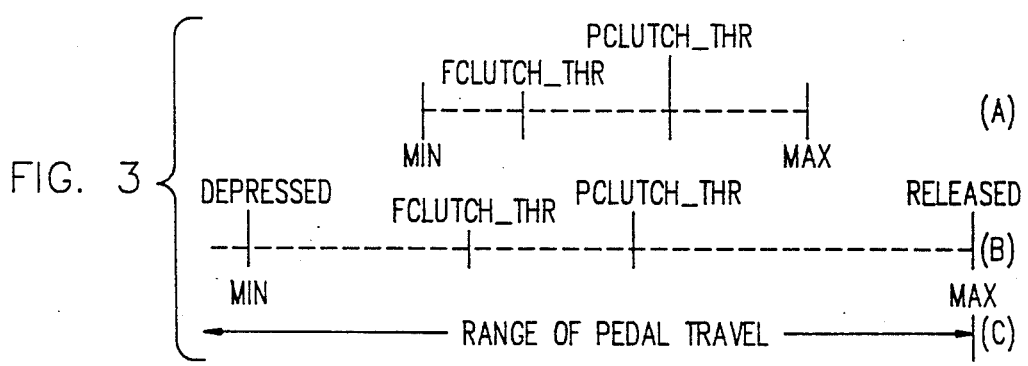

5,161,405

CLUTCH PEDAL POSITON SENSOR CONTINUOUS CALIBRATION

BACKGROUND OF THE INVENTION

The present invention relates to a method of calibrating sensors and more particularly to a method of calibrating a potentiometric sensor used for sensing the position of a clutch pedal in a microprocessor controlled transmission system.

Commonly owned copending application Ser. No. 07/710,360 entitled Transmission Speed Matching control, discloses a microprocessor controlled off-road vehicle transmission wherein a clutch pedal is mechanically linked to a sensing potentiometer so that the voltage output from the potentiometer may be sensed to determine the position of the clutch pedal. The analog voltage output of the potentiometer is digitized by the microprocessor and compared with stored threshold values to determine when the clutch pedal is fully depressed, or when it is depressed below an intermediate threshold point or released above an intermediate threshold point.

Because there is a lack of uniformity between sensors and between linkages which mechanically link a clutch pedal to a sensor, the sensor in each system has to be individually calibrated after being initially installed. Furthermore, tolerances, aging, wear and other variations in a sensor and any associated linkage results in a lack of sensor calibration and periodic recalibration is required to insure that the sensor output signal accurately reflects the condition sensed. The recalibration procedure is not easily carried out by the average individual and, of course, requires special electrical test equipment.

SUMMARY OF THE INVENTION

An object of the present invention is to provide a novel method and apparatus for automatically calibrating a sensor.

Another object of the invention is to provide a method and apparatus for automatically calibrating a potentiometric sensor each time the output of the sensor is sensed for a control purpose.

A further object of the invention is to provide a novel method and apparatus for calibrating a clutch pedal position sensing potentiometer, the calibration being automatically carried out while a vehicle is in use.

In accordance with the principles of the present invention, two range limit values are stored in a non-volatile memory at locations MIN_NVM and MAX_NVM so that they are not lost when power is turned off. When the system in which the sensor is located is turned on, MIN_NVM and MAX_NVM are retrieved from the memory, a constant DEC is subtracted from the value from MAX_NVM and added to the value from MIN_NVM to obtain range limit values which are saved at locations MAX and MIN, respectively. During subsequent operation of the system in which the sensor is located, each time the output of the sensor is sensed for a control purpose, it is digitized to obtain a clutch position value VAL. VAL is then compared with MAX and MIN. If VAL is greater than MAX then VAL is saved at MAX and the new value of MAX is transferred to the non-volatile memory location MAX_NVM. If VAL is less than MIN then VAL is saved at MIN and the new value of MIN is transferred to the non-volatile memory location MIN_NVM. If VAL is neither greater than MAX nor less than MIN then calibration is not required. When either MAX or MIN is changed any intermediate threshold point may be recalculated using constants stored in the non-volatile memory.

Other objects and advantages of the invention and its mode of implementation will become apparent upon consideration of the following description and the accompanying drawings.

BRIEF DESCRIPTION OF THE DRAWINGS

FIG. 1 schematically represents a microprocessor controlled transmission system;

FIG. 2 illustrates a routine executed by the microprocessor to calibrate a clutch pedal position sensor; and FIG. 3 is a diagram useful in understanding the operation of the invention.

DETAILED DESCRIPTION OF THE INVENTION

For purposes of illustrating a preferred embodiment of the invention, FIG. 1 shows a microprocessor controlled transmission system for an off-road vehicle and including microprocessor 10, a transmission 12, a clutch pedal 14 and a sensor in the form of a potentiometer 16. One end of the potentiometer is connected to the microprocessor which supplies a reference voltage VREF to the potentiometer. The other end of the potentiometer is connected to ground. Clutch pedal 14 is linked to the wiper arm 18 of the potentiometer by a schematically represented conventional mechanical linkage 20. The wiper arm is connected to an analog input channel of the microprocessor 10. A further mechanical linkage 22 links the clutch pedal to a modulating valve (not shown) in the transmission 12.

The microprocessor 10 may be an 8061 program-controlled processor of the type used for automotive control purposes in products of the Ford Motor Company and includes conventional ROM and RAM memories and an analog input channel for sampling the voltage present at the wiper arm 18 and converting it to a digital value VAL. The microprocessor also includes a non-volatile memory 24 for saving values even though the vehicle ignition is turned off.

The transmission 12 as well as the features of the microprocessor 10 are described in the above-referenced copending application, the disclosure of which is incorporated herein by reference. As explained in that application, the transmission 12 includes synchronized couplers which are mechanically shifted via linkages 28 by shift levers included in operator controls 26. The transmission 12 also includes electro-hydraulic powershift clutches which are energized by signals from microprocessor 10 when the operator either shifts a lever or operates powershift controls included in the operator controls 26. Because of the manner in which the powershift clutches are automatically selected upon movement of a shift lever, special means are provided which permits an operator to depress the clutch pedal, shift a lever, change his mind and return the shifted lever to its original position before the clutch pedal is fully released, and have the transmission in the same gear that was in effect at the time the clutch pedal was depressed. This feature permits an operator to change his mind provided that the clutch pedal has not moved more than about 55% of the distance from its fully depressed position toward its released position. To determine if the clutch pedal has travelled about 55% of the distance from the fully depressed position to the released position a value PCLUTCH_THR is stored in a RAM memory and compared with the digitized output of the clutch pedal potentiometer. It is therefore important that the output of potentiometer 16 accurately reflect the position of the clutch pedal 14. In the transmission system described in the above-mentioned patent application, at least one electro-hydraulic powershift clutch is located between the transmission input shaft and the shiftable couplers. The position of the clutch pedal is sensed and, when the clutch pedal is within 12% of its full scale travel distance from the fully depressed position, the fluid is dumped from the powershift clutches. This insures that the transmission is not driven at the time mechanical shifting takes place and thus reduces synchronizer wear. A digital value FCLUTCH_THR stored in memory defines the 12% point. At certain times in its control program the microprocessor senses the output of potentiometer, digitizes it, and compares the digitized value with FCLUTCH_THR to determine when the hydraulic fluid is released from the powershift clutches.

From the foregoing description it is obvious that if the clutch pedal linkage 20 shown in FIG. 1 should wear, or its adjustment is changed during servicing, or if the resistance of the potentiometer 16 should change, the wrong powershift gear might be selected or the transmission might be disconnected from the input drive shaft too soon or too late. In accordance with the principles of the present invention the microprocessor 10 periodically calibrates the potentiometer 16 and establishes new values FCLUTCH_THR and PCLUTCH_THR in a manner that is transparent to the operator.

FIG. 2 illustrates those portions of a program executed by the microprocessor to carry out the calibration. When the ignition is turned on, the microprocessor executes a power-up reset and initialization routine as is conventional. As part of the initialization the microprocessor, at step 40, retrieves two values MIN_NVM and MAX_NVM from the non-volatile memory 24. These values electrically define, in digital form, the initial depressed and fully released positions of the clutch pedal. As will be evident from the following description, MIN_NVM and MAX_NVM were values representing the fully depressed (MIN) and fully released (MAX) positions, respectively, of the clutch pedal at the time power to the system was turned off.

At step 42, the range is reduced by adding a value DEC to MIN_NVM and subtracting the value DEC from MAX_NVM to obtain two range limits MIN and MAX, respectively. Referring to line A of FIG. 3 it is seen that this reduces (electrically) the effective range of the clutch pedal to a small degree on the order of about 2%. The microprocessor 10 is now ready to calibrate the potentiometer.

After step 42 is executed, the microprocessor 10 begins execution of routines as described in the aforementioned application to control the powershift clutches in the transmission according to actuation of the operator controls 26. At various points in these routines the microprocessor must sample the output voltage of potentiometer 16 and digitize it to determine the clutch pedal position, i.e. depressed or released. The sampling and digitizing operations take place at step 43. After the output of the potentiometer is sensed and digitized to produce a value VAL indicating the clutch pedal position, step 44 compares VAL with MIN.

If step 44 shows that VAL is less than MIN, step 45 is executed to set MIN equal to VAL and then set MIN_NVM equal to MIN. The routine then executes step 46 to calculate and store new threshold values PCLUTCH_THR and FCLUTCH_THR. For FCLUTCH THR this is accomplished by subtracting MIN from MAX, multiplying the difference by a constant K1, (12%) and adding MIN to the product. The new value of PCLUTCH_THR is computed in a similar manner except that a constant K2 (55%) is used. The constants K1 and K2 are stored in a ROM so that they are not lost when power is turned off.

If the test at step 44 proves false, VAL is compared with MAX at step 47. If VAL is greater than MAX, step 48 is executed to transfer VAL to MAX and then MAX to MAX_NVM. The routine then executes step 46 to calculate and store new values of PCLUTCH_THR and FCLUTCH_THR.

If the tests at step 44 and 47 both prove false, recalibration of the potentiometer is not required and PCLUTCH_THR and FCLUTCH_THR do not require correction. After step 46 or 47, the microprocessor proceeds with its normal control routine and makes the decision which required it to sense the potentiometer output at step 43.

The next time the microprocessor requires knowledge of the position of the clutch pedal it repeats that portion of the routine represented by steps 43–48. The potentiometer is thus repeatedly calibrated during normal operation without requiring any special action to be taken by the operator. Since the latest range end values are always saved at MIN_NVM and MAX_NVM in the non-volatile memory, they are available even after the ignition system is turned off and later turned on.

Although the sensor range is initially decreased at start-up (step 42) by a small amount, the extremes quickly expand back out to the actual values if a change in the range of the potentiometer output has not occurred.

FIG. 3 graphically depicts the recalibration. The fully physically released position of the clutch pedal is represented by the digitized value MAX. However, MIN defines the electrically fully depressed state of the clutch pedal. As is evident by comparing lines (B) and (C) of FIG. 3, the clutch pedal may be physically depressed beyond MIN. Step 46 of the routine shown in FIG. 2 recalculates the values FCLUTCH_THR and PCLUTCH_THR so that the distance from MIN to FCLUTCH_THR is 12% of the distance from MIN to MAX and the distance from MIN to PCLUTCH_THR is 55% of the distance from MIN to MAX.

While a specific preferred embodiment of the invention has been described by way of illustration, it will be understood that the present invention is not limited to the calibration of potentiometers. The basic principles of the invention are equally applicable to other types of sensors, or to sensors for sensing conditions other than clutch pedal position. It is intended therefor to be limited only by the scope of the appended claims.

The invention in which an exclusive property or privilege is claimed is defined as follows:

1. A method of controlling a system in response to movement of a control element having a sensor linked thereto which produces an output voltage signal representing the position of said element, said method comprising the steps of:

a) intermittently moving said control element;
b) providing first and second storage means initially storing first and second electrical signals, respectively, said first and second signals representing first and second end limit values, respectively of a range of movement of the element;
c) sensing the output voltage signal from said sensor to generate an electrical signal representing a position value of said control element;
d) comparing the signal representing the position value with the signals stored in the first and second storage means;
e) replacing the electrical signal in the first storage means with the electrical signal representing the position value when the signal representing the position value is less than the signal stored in the first storage means;
f) replacing the electrical signal in the second storage means with the electrical signal representing the position value when the signal representing the position value is greater than the signal in the second storage means;
g) prior to comparing the signal representing the position value with the signals stored in the first and second storage means, adding a signal representing a constant value to the electrical signal in the first storage means and subtracting a signal representing a constant value from the electrical signal in the second storage means; and,
h) controlling the system in accordance with the electrical signal representing the position value and at least one of the signals stored in said first and second storage means.

2. The method as claimed in claim 1 wherein steps c) through f) and h) are repeatedly carried out.

3. The method as claimed in claim 1 wherein steps c) through f) and h) are repeatedly intermittently carried out.

4. The method as claimed in claim 1 wherein the output voltage signal from the sensor is intermittently sensed to control the element and the sensor output voltage signal is compared with at least one of the signals in the first and second storage means to generate a signal for controlling the element.

5. The method as claimed in claim 1 wherein the step of controlling said system includes the step of comparing the electrical signal representing the position value with an electrical signal derived from the signals stored in said first and second storage means.

6. Apparatus for controlling a system in response to movement of a control element having a sensor linked thereto which produces an output voltage signal representing the position of said control element, said apparatus comprising:
first and second storage means for storing electrical signals defining, respectively, first and second end limit values of a range of movement of said element;
sample means for intermittently sampling the output voltage signal from the sensor to produce signals representing position values of said control element as said control element is moved;
comparing means for comparing each signal representing a position value with the signals in said first and second storage means;
first means responsive to said comparing means for replacing the signal in said first storage means with a signal representing a position value when a position value is less than the value in said first storage means;
second means responsive to said comparing means for replacing the signal in said second storage means with a signal representing a position value when the position value is greater than the value in said second storage means;
third means operative when electrical power to the control system is first turned on for modifying the signals in said first and second storage means to thereby effect an increase of the first limit value by a constant value and a decrease of the second limit value by a constant value; and,
fourth means for controlling the system in accordance with the signal representing a position value and the signals in said first and second storage means.

7. Apparatus as claimed in claim 6 wherein said system is a transmission system and said control element is a clutch pedal.

8. Apparatus as claimed in claim 6 wherein said first and second storage means are embodied in a non-volatile memory.

9. Apparatus as claimed in claim 6 wherein said third means comprises means for modifying the signals in said first and second storage means prior to the time said comparing means first compares a signal representing a position value with the signals in the first and second storage means.

10. Apparatus as claimed in claim 8 wherein said fourth means includes:
a threshold comparator for comparing said sampled sensor output voltage signal to a current threshold value representing an intermediate position of said clutch pedal to thereby produce a control signal, said intermediate position being separated from said first end limit by a fixed percentage of the distance between said first and second end limits;
means for storing a percentage value representing said percentage in said non-volatile memory;
means for storing a current threshold value representing the magnitude of the sampled output signal from said sensor when said clutch pedal is at said intermediate position; and,
means responsive to said threshold comparing means and said stored percentage value for calculating and storing a new value as said current threshold value when the sampled output voltage signal from said sensor is less than the signal in said first storage means or greater than the signal in said second storage means.

11. Apparatus as claimed in claim 10 wherein the means for calculating a new value as said current threshold value comprises means for multiplying the difference between the signals in said first and second storage means by said percentage value and adding the value in said first storage means to the result obtained by the multiplication.

* * * * *